United States Patent [19]

Ewers et al.

[11] Patent Number: 4,570,973
[45] Date of Patent: Feb. 18, 1986

[54] FIRE TRUCK TORQUE BOX AERIAL FRAME

[75] Inventors: Ronald L. Ewers; Bruce C. Barton, both of Ocala, Fla.

[73] Assignee: Federal Motors, Inc., Oscla, Fla.

[21] Appl. No.: 591,829

[22] Filed: Mar. 21, 1984

[51] Int. Cl.⁴ .............................................. B62D 21/00
[52] U.S. Cl. ..................................... 280/800; 296/204
[58] Field of Search ............... 280/781, 786, 789, 800; 296/182, 183, 204

[56] References Cited

U.S. PATENT DOCUMENTS

| | | | |
|---|---|---|---|
| 1,953,620 | 4/1934 | Maddock et al. | 280/800 |
| 1,962,497 | 6/1934 | Francis | 280/781 |
| 3,622,171 | 11/1971 | Gottschalk | 296/204 |

FOREIGN PATENT DOCUMENTS

| | | | |
|---|---|---|---|
| 435191 | 5/1948 | Italy | 280/789 |
| 125263 | 6/1949 | Sweden | 280/800 |

*Primary Examiner*—Joseph F. Peters, Jr.
*Assistant Examiner*—Ross Weaver
*Attorney, Agent, or Firm*—Beaman & Beaman

[57] ABSTRACT

The invention pertains to a vehicle frame particularly suitable for use with fire truck aerial apparatus wherein the frame comprises a torque box highly resistant to twisting and deformation. The frame is of a box configuration, fully enclosed, wherein the bottom surface is inwardly recessed to provide clearance for the vehicle driveshaft, and to provide rigidity and resistance to twisting, internal K-bracing plates are welded to the lateral and bottom frame portions.

2 Claims, 6 Drawing Figures

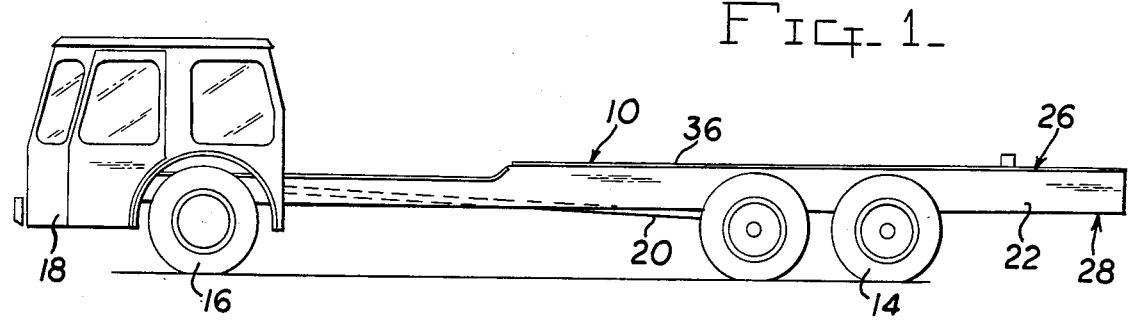
Fig. 1.
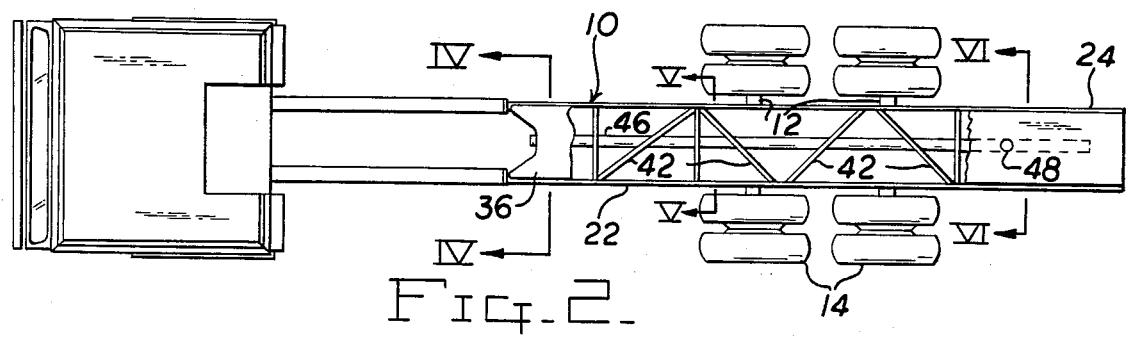
Fig. 2.
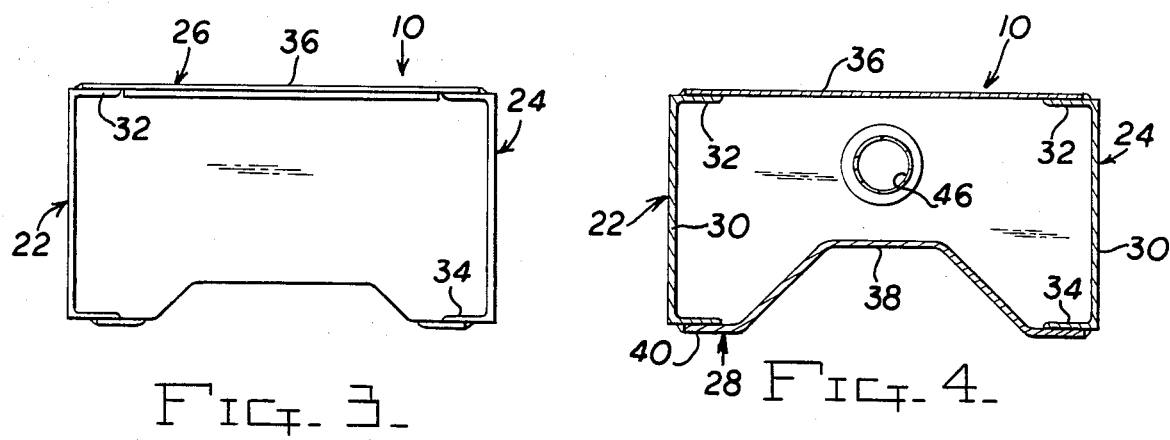
Fig. 3.  Fig. 4.
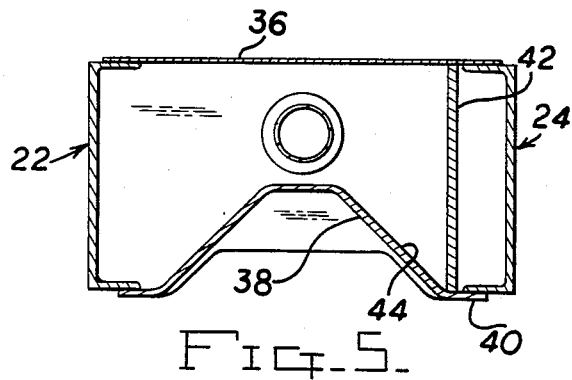
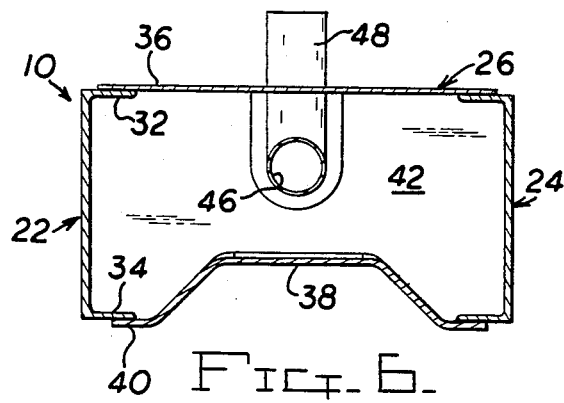
Fig. 5.  Fig. 6.

FIRE TRUCK TORQUE BOX AERIAL FRAME

BACKGROUND OF THE INVENTION

Vehicles utilized to support heavy loads, such as trucks, usually include a frame of welded or riveted components which purposely allow the frame to twist slightly under lateral deformation in order to permit the vehicle to accommodate itself to irregularities in the road surface and maintain adequate road contact.

However, when a vehicle is utilized to support aerial equipment such as extendable ladders as used on fire trucks, such apparatus imparts very high bending and lateral twisting forces upon the vehicle frame which are unacceptable for safe aerial ladder use. Accordingly, it is the common practice with aerial fire fighting vehicles to fabricate a "torque box" having great resistance to twisting and support such torque box upon a conventional truck framework chassis and mount the aerial apparatus on the torque box. The torque box may have hydraulically actuated ground-engaging jacks on outriggers mounted thereon, and the rigid nature of the torque box permits the extended aerial equipment to be safely used.

The fabrication of a separate torque box within a conventional vehicle frame is expensive, and special connecting apparatus must be interposed between the conventional vehicle frame and the torque box portion. Furthermore, in view of the high strength characteristics of the lightweight vehicle frame it is usually necessary to form this frame of an expensive alloy steel having 110,000 pound tensile strength, and such high strength steel is not readily welded, but rather, bolts and fasteners are required for assembly.

It is an object of the invention to provide a torque box frame for a vehicle capable of supporting aerial apparatus wherein the frame, itself, constitutes a torque box capable of resisting lateral twisting forces imposed thereon by extended aerial apparatus.

Yet another object of the invention is to provide a torque box vehicle frame which has great resistance to lateral twisting, but may be fabricated from readily available components by conventional welding techniques.

A further object of the invention is to provide a vehicle torque box frame which has sufficient rigidity to permit the use of low strength tensile resistance steel, and yet adequately provide a stable support for aerial devices.

In the practice of the invention the vehicle frame is of an elongated form and is of a box configuration in transverse cross section. The lateral sides of the frame are formed of channel beams wherein the legs thereof extend toward each other. The upper plate of the frame is affixed to the upper channel legs, and the lower plate is welded or otherwise attached to the lower legs.

The lower portion of the frame is of a generally concave form to provide clearance for the vehicle driveshaft, and a water conduit may extend through the frame within the box configuration for the purpose of supplying water to fire fighting apparatus located on the aerial equipment.

Internally, K-bracing extends between the frame lateral sides in the form of plates having a vertical dimension substantially equal to the frame box vertical dimension. The K-bracing plates are welded to the lateral sides, and the lower edge thereof is of a form including a concave configuration to accommodate itself to the concave form of the bottom frame plate. The K-bracing reinforcing plates are welded to the bottom plate, as well as the lateral sides, and the presence of the K-bracing further greatly adds to the rigidity of the frame.

BRIEF DESCRIPTION OF THE DRAWINGS

The aforementioned objects and advantages of the invention will be appreciated from the following description and accompanying drawings wherein:

FIG. 1 is an elevational side view of a vehicle using the torque box frame in accord with the invention, FIG. 2 is a top plan view of the vehicle of FIG. 1, the top plate being partially broken away, FIG. 3 is an elevational end view of the truck frame as taken from the right of FIG. 2, FIG. 4 is an elevational sectional view through the frame along Section IV—IV of FIG. 2, FIG. 5 is an elevational, sectional view taken along Section V—V of FIG. 2, and FIG. 6 is an elevational, sectional view taken along Section VI—VI of FIG. 2.

DESCRIPTION OF THE PREFERRED EMBODIMENT

With reference to FIGS. 1 and 2, a typical vehicle utilizing the concepts of the invention comprises a truck having a main body frame 10 mounted upon a pair of rear axles 12 supporting wheels 14. At its front end, the steerable wheels 16 are connected to the frame by known mechanisms, and the truck cab 18 houses the engine, driver's compartment, and other conventional features. The engine is located within the cab and is connected to the differentials, not shown, incorporated within the axles 12 through the conventional driveshaft 20 extending from the engine to the rear wheels below the frame.

The frame is of an elongated configuration having a general transverse cross sectional form as will be apparent from FIG. 3. However, the form with respect to the lower portion varies throughout the length of the frame as will be apparent from FIGS. 4, 5 and 6.

The frame includes lateral sides 22 and 24, FIG. 3, and upper portion 26 and lower portion 28.

The lateral sides of the frame are defined by channel beams of conventional rolled construction each including a planar base portion 30 and upper legs 32 and lower legs 34 depending at right angles from the base portion, and the legs of the spaced lateral sides are disposed in a direction toward each other.

The upper portion 26 of the frame is closed in by the top plate or panel 36 which overlaps the upper legs 32 and is welded thereto. The lower portion of the frame is enclosed by the lower plates 38 which are welded to the lower legs 34 of the lateral channels. Throughout its length, the lower plates 38 consist of a plurality of plates of changing configuration and the lower plates are formed with flanges 40 which extend below the legs 34 for welding thereto.

As will be appreciated from FIGS. 3, 4, 5 and 6, the lower plates 38 are of a concave configuration extending upwardly, and this form provides clearance for the driveshaft interconnecting the engine with the drive wheels 14.

To produce the desired rigidity and resistance to twisting, a plurality of K-bracing members are incorporated into the torque box frame. These bracing or reinforcing members comprise plates 42 which diagonally extend across the frame and are welded at their ends to the base portion 30 of the lateral sides. The bracing plates 42, at their lower surface 44, are of a configuration corresponding to the shape of the bottom plates 38, and the lower edge of the reinforcing plates is welded to the bottom plate as well as to the lateral channels. As will be appreciated from FIG. 2, four reinforcing plates are incorporated into the torque box frame in the load carrying region of the frame, and the disclosed frame is for a truck having a frame length of slightly over 400 inches.

The disclosed vehicle frame is especially suitable for use as a fire fighting vehicle capable of supporting aerial equipment such as an extensible ladder. As it is often desired to pump water from such equipment a conduit 46 extends substantially throughout the length of the frame through the reinforcing plates 42, and as apparent in FIG. 6, communicates with the upwardly extending conduit 48 extending through the upper plate 36. The left end of the conduit, FIG. 2, connects with pumps or other connections for supplying water to the conduit.

As the vehicle frame described above is formed of a closed box configuration and internally utilizes the K-bracing plates the frame is highly resistant to twisting and provides a firm base for the aerial equipment mounted upon the frame, not shown. Of course, it is the usual practice to utilize hydraulically lowered outrigger jacks or supports with aerial equipment, and the same would be attached to the frame in a conventional manner for stabilizing the frame as used as an aerial apparatus platform. In a commercial embodiment the width of the frame 10 is approximately 34 inches while the vertical height is in the neighborhood of 18 inches.

It is appreciated that various modifications to the inventive concepts may be apparent to those skilled in the art without departing from the spirit and scope of the invention.

We claim:

1. A vehicle frame characterized by its ability to resist torque forces and particularly suited for supporting aerial apparatus comprising, in combination, an elongated body having front and rear ends, an upper portion, lateral sides, and a bottom portion, said body having a box transverse cross section whereby said upper and bottom portions are rididly affixed to said lateral sides, said bottom portion being concave and extending toward said upper portion, said body lateral sides comprising channel beams each having a base and top and bottom legs extending in a common direction from said base inwardly toward said other lateral side, an upper plate extending between said channels' top legs and affixed to the upper side thereof comprising said body upper portion, a plurality of shaped concave plates extending between said channels' bottom legs and affixed thereto defining said body bottom portion, said concave plates including flanges engaging and affixed to the underside of said channels' bottom and a central concave portion extending upwardly toward said body upper portion, and a plurality of reinforcing plates within said body diagonally extending transversely across said body having ends affixed to said channel beams, said reinforcing plates being of a vertical dimension substantially equal to the vertical dimension of said body at the location of said reinforcing plate, said plates having a lower concave edge conforming to the configuration of said bottom portion plates.

2. In a vehicle frame as in claim 1, a tube within said body substantially parallel to the length thereof and extending through said reinforcing plates.

* * * * *